United States Patent [19]
Lorenzo

[11] 3,942,380
[45] Mar. 9, 1976

[54] DIFFERENTIAL DISPLACEMENT THERMOSENSING DEVICE

[75] Inventor: Roberto D. Lorenzo, Attleboro, Mass.

[73] Assignee: Texas Instruments Incorporated, Dallas, Tex.

[22] Filed: July 8, 1974

[21] Appl. No.: 486,271

[52] U.S. Cl. ............. 73/362.3; 29/195.5; 73/363.1; 337/394
[51] Int. Cl.² .......................................... G01K 5/50
[58] Field of Search............ 73/363.1, 362.3, 363.3; 29/195.5; 236/102; 337/393, 394, 399

[56] References Cited
UNITED STATES PATENTS

| | | | |
|---|---|---|---|
| 1,939,085 | 12/1933 | Scott.................................. | 29/195.5 |
| 2,640,129 | 5/1953 | Starbird........................ | 73/362.3 X |
| 2,697,130 | 12/1954 | Korbelak ...................... | 29/195.5 X |
| 3,004,123 | 10/1961 | Cannon.......................... | 73/363.1 X |
| 3,116,641 | 1/1964 | Parks............................... | 73/362.3 |
| 3,282,108 | 11/1966 | Bordeaux et al................... | 73/362.3 |

*Primary Examiner*—Richard C. Queisser
*Assistant Examiner*—Daniel M. Yasich
*Attorney, Agent, or Firm*—James P. McAndrews; John A. Haug; Russell E. Baumann

[57] ABSTRACT

A rod and tube thermosensing device adapted for high temperature use has a first rod member comprising a rod of refractory metal having a metal cladding thereon which protects the refractory metal against excessive oxidation and which cooperates with the rod of refractory metal in providing the first member with a relatively low effective coefficient of thermal expansion. This first rod member is coaxially disposed in a tube of a metal of relatively higher coefficient of thermal expansion and has one end of the rod member secured to a corresponding end of the tube, whereby the opposite ends of the first rod member and tube are free to move relative to each as an indication of the temperature to which the device is subjected.

4 Claims, 3 Drawing Figures

DIFFERENTIAL DISPLACEMENT THERMOSENSING DEVICE

BACKGROUND OF THE INVENTION

This invention relates to the field of temperature sensing and control and more particularly to an improved differential displacement thermosensing device.

Among the most practical and advantageous thermosensing devices which operate on the differential displacement principle is the rod-and-tube thermostat. This device has a rod positioned concentrically within a tube and rigidly attached to the tube at one end of each. The tube and rod are constituted of dissimilar metals of significantly differing thermal coefficients of expansion so that on change of temperature, the relative displacement between the free end of the tube and the free end of the rod can be utilized for measurement and control purposes.

Rod-and-tube differential displacement thermosensing devices have proved to be practically useful in numerous applications. A relatively new application for which rod-and-tube thermostats are particularly well adapted is in measurement and control of the temperature of catalytic converters or afterburners in automotive exhaust systems. Since the catalyst utilized in these systems is adversely affected by excessive temperatures, it is important to provide systems for both alerting the driver to a high-temperature condition and automatically controlling the exhaust temperature so as to avoid damage to the catalyst before appropriate adjustments or maintenance necessary to eliminate the cause of high temperatures can be performed. The thermal response of the rod-and-tube thermostat probe may be used, for example, as an indication of excessive temperature which can be transmitted to the dashboard for warning the driver, and as a means for initiating automatic control action such as opening a valve to permit flow of outside air over the catalyst to cool it.

In order to provide reliable and sensitive temperature indication and control, the rod and the tube members of the differential displacement thermosensing device should have coefficients of thermal expansion which differ as widely as possible. For fabrication purposes, it is also desirable that the materials from which the device is produced have good workability and be readily welded or brazed to provide for a rigid attachment at positions on each member of the device.

For reliability over an extended period of operation, it is also important that the materials from which the thermosensing device is fabricated be resistant to both corrosion and mechanical deterioration. It is especially important that both the rod and tube of a rod-and-tube thermosensing device be resistant to creep so that the device consistently and repeatably provides the same indication and control function at a given temperature in the environment in which it is utilized. Because of the high temperatures and potentially corrosive atmospheres prevailing in the catalytic converter chamber of an automotive exhaust system, corrosion resistance and creep strength represent demanding and difficult critera for a rod-and-tube thermostat to be used in such a system.

SUMMARY OF THE INVENTION

Among the several objects of the present invention, therefore, may be noted the provision of an improved differential displacement thermosensing device, in particular one of the rod-and-tube type; the provision of such a device which provides a reliable and repeatable response to variations in temperature of the environment in which the device is used; the provision of such a device which may be readily fabricated from relatively low-cost materials; and the provision of such a device whose members are resistant to corrosion and creep at temperatures through 2,000°F. Other objects and features will be in part apparent and in part pointed out hereinafter.

The present invention, therefore, relates to an improvement in a differential displacement thermosensing device comprising a first member free at one end thereof and rigidly attached at another position therealong to a second member whose dimensional response to a change in temperature differs from that of the first member, the second member including a free end whose displacement from the free end of the first member varies with and thereby senses the temperature of the device. In this improvement the first member comprises a core of a material whose coefficient of thermal expansion differs from that of the second member. A corrosion-resistant ductile metal cladding on the core protects the core from deterioration in an environment in which the device may be used. The dimensions of the cladding and the strength of its constituent metal are such that, in the direction of temperature-sensing displacement, any mechanical strain in the first member resulting from differences between the thermal coefficient of expansion of the core and that of the cladding occurs predominantly in the cladding and not in the core.

The invention is particularly directed to a rod-and-tube thermosensing device where the rod has a core of a refractory metal.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
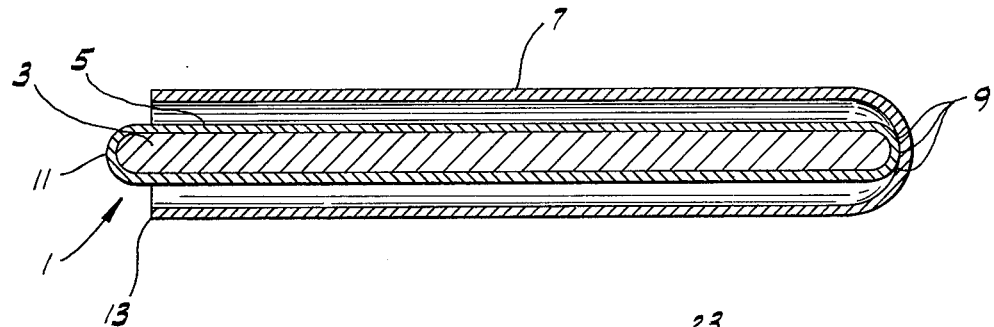
FIG. 1 is a longitudinal section illustrating a rod-and-tube thermosensing device made in accordance with the invention.

Refractory metals have been found to be highly advantageous materials of construction for one member of the differential displacement thermosensing device. Particular metals which are suitable for this purpose include tungsten, molybdenum, tantalum, niobium and certain alloys of these metals with one another and with other metals such as titanium and zirconium. Useful alloys include an alloy consisting of 90% by weight tantalum and 10% by weight tungsten, and alloy TZM comprising molybdenum alloyed with 0.5% by weight titanium and 0.08% by weight zirconium and containing 0.015% by weight carbon. The unalloyed elemental refractory metals are generally preferred, however, since they are more readily workable than the alloys.

Refractory metals and their alloys retain their strength and creep resistance at elevated temperatures (through 2,000°F.) and may be fabricated by working, welding or brazing. They are especially advantageous in a differential displacement thermosensing device because they exhibit very low coefficients of thermal expansion. If a refractory metal member is used in conjunction with another member having a high thermal coefficient of expansion, the thermosensing device constructed therefrom exhibits a high rate of differential thermal expansion with respect to temperature.

Refractory metals, however, suffer from the disadvantage of poor resistance to oxidation. If the refractory metal, as such, is used as the material of construction of one member of a rod-and-tube or other differential displacement thermosensing device, therefore, it undergoes oxidation at elevated temperatures which leads to its deterioration and ultimately to its destruction.

In accordance with the present invention, it has been discovered that a refractory metal may be used for the core of the rod member of a rod-and-tube thermosensing device and this core protected against oxidation by a cladding of a ductile corrosion-resistant metal. Although most satisfactory corrosion-resistant cladding materials have coefficients of thermal expansion substantially higher than that of the refractory metals, the selection of a cladding material having a sufficiently low strength at operating temperatures avoids any significant deleterious effect on the sensitivity or repeatability of the device due to the cladding's tendency to expand rapidly in response to temperature. If the thickness of the cladding is relatively small relative to the thickness of the core, and the strength of the constituent metal of the cladding is relatively low, any longitudinal mechanical strain in the rod resulting from differences between the thermal coefficient of expansion of the core and that of the cladding occurs predominantly in the cladding and not in the core, and the dimensional response to temperature of the rod is not substantially different from that of the core in the absence of the cladding. As a result, a measurable change in displacement is provided between the free end of the rod and the free end of the tube if the tube comprises a relatively high coefficient of expansion material.

A cladding material which has been found to be highly effective in protecting refractory metals from oxidation in the typical environment in the converter chamber of an automotive exhaust system, is a ferrite stainless steel designated at "Type 430." Type 430 stainless steel contains about 17% by weight chromium, up to about 0.12% by weight carbon and the balance essentially iron. At elevated temperatures in an oxidizing atmosphere, 430 stainless steel forms a tightly adherent protective film of chromic oxide. It has a high ductility and low strength at temperatures in the range of 1,500°–2,000°F.

Where the rod core is a refractory metal, the tube member of the thermosensing device is desirably a relatively high coefficient of thermal expansion material. It has been found that a high expansion metal which is resistant to corrosion by automotive exhaust gases and retains its creep strength at temperatures through 2,000°F. is that designated as Type 800 stainless steel. Type 800 stainless steel consists of approximately 32% by weight nickel, approximately 25% by weight chromium, approximately 46% by weight iron, approximately 0.04% by weight carbon, approximately 0.4% by weight titanium, and approximately 0.4% by weight aluminum. 800 stainless steel has a coefficient of thermal expansion of $10.1 \times 10^{-6}$ at 1,700°F. and in addition to its creep strength, exhibits good oxidation resistance, good weldability, and excellent resistance to cracking under thermal cycling conditions. In particular, this alloy does not become embrittled by sigma phase precipitation.

FIG. 1 shows a rod-and-tube thermosensing device of the type described above. Rod 1 has a refractory metal core 3 clad with a jacket 5 of type 430 stainless steel. Rod 1 is concentrically positioned within tube 7 of 800 stainless steel and rigidly attached thereto at 9 as by welding or brazing. Free ends 11 and 13 of rod 1 and tube 7, respectively, expand in response to increases in temperature. The differential displacement between these ends provides an indication of temperature and may be used to operate and/or initiate operation of a control valve or other temperature control device. The rod-and-tube device of FIG. 1 is readily fabricated and the cost of its constituent materials is sufficiently low to make the device attractive as a thermostat probe for catalytic converters in automotive exhaust systems.

Figure 2:
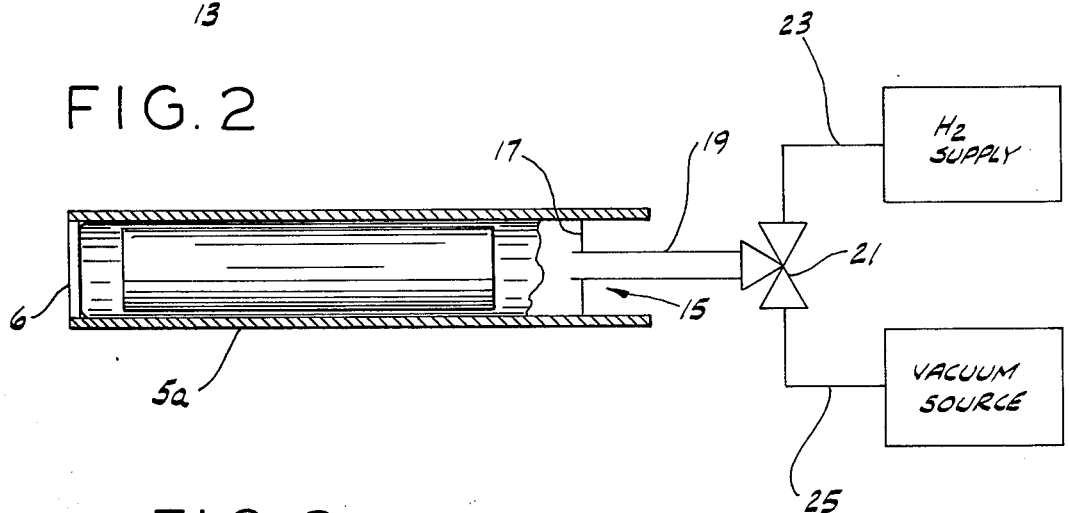
FIG. 2 is a schematic and longitudinal sectional view illustrating a method of cladding a tungsten core to provide a clad rod of the type useful in the device of the invention.
Figure 3:
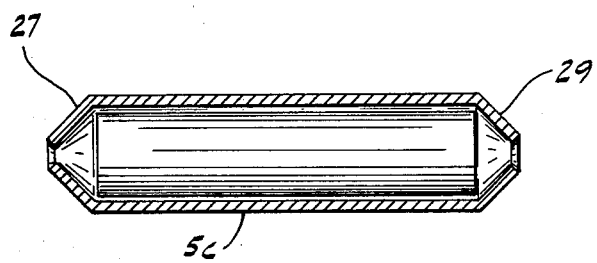
FIG. 3 is a longitudinal sectional view illustrating a method for cladding a tantalum, molybdenum or niobium core to provide a rod useful in the device of the invention.

FIGS. 2 and 3 illustrate methods of cladding the rod of the device shown in FIG. 1. FIG. 2 is directed to the method of cladding tungsten, while FIG. 3 shows the cladding of tantalum, niobium or molybdenum. Each of the refractory metals has a body centered cubic crystal structure and undergoes a ductile brittle transition as the temperature is lowered. At temperatures in the brittle range, forming and fabricating are generally impractical. Molybdenum, niobium and tantalum have relatively low transition temperatures and can be worked at room temperature. Tungsten, however, has a transition temperature of about 600°F. and is preferably worked at temperature on the order of 1200°F. To avoid oxidation during working, tungsten is preferably worked in a controlled atmosphere, e.g., in hydrogen.

The following examples illustrate the invention:

EXAMPLE 1

Referring to FIG. 2, at 5a is shown a Type 430 stainless steel capsule provided with a 430 stainless steel plug 6 welded in one of its ends. The capsule was 0.385 inch in diameter by 7 inches long, and had a wall thickness of 0.025 inch. A tungsten core, 0.312 inch in diameter by 4½ inches long, was inserted in the capsule. A nozzle 15, having a flange 17 and a nipple 19, was then welded into the end of the capsule into which the tungsten core had been inserted. The common port of a three-way valve 21 was then connected to the outer end of nipple 19, and a hydrogen supply line 23 and vacuum line 25 were respectively connected to the other ports of valve 21. Capsule 5a was evacuated through line 25 and back-filled with hydrogen under positive pressure through line 23. The capsule was then sealed and hot-swaged at 1,200°F. to an outside diameter of 0.093 inch providing a clad rod having a 430 stainless steel cladding 10 mils thick metallurgically bonded to the tungsten core. Excess 430 stainless steel cladding material was then removed from the ends and the rod was then cut into the desired lengths for the rod of a rod-and-tube thermostat. Each length of rod was concentrically inserted in an 800 stainless steel tube closed at one end, having an outside diameter of 0.175 inch and an inside diameter of 0.097 inch. Using a tungsten inert gas-welding system, the rod and tube were welded together at the closed end of the tube and the free end of the tube was fused to seal the cladding over the free end of the core.

EXAMPLE 2

Referring to FIG. 3, a molybdenum core 0.312 inch in diameter by 4½ inches long, was inserted in 430 stainless steel capsule 5c which was 0.385 inch in diameter by 7 inches long. The ends of capsule 5c were then swaged as shown at 27 and 29 to avoid sliding of the core within the capsule. The entire capsulecore assembly was then swaged to an outside diameter of 0.093 inch, causing a metallurgical bond to be formed between the 430 stainless steel cladding and the molybdenum core. Excess stainless steel was then trimmed off the ends to provide a rod which was utilized to fabricate rod-and-tube thermosensing devices in the manner described in Example 1.

Rod-and-tube thermosensing elements as described above have been tested by subjecting them to 1000 hours of cycling between 1,000°F. and 1,800°F. At the conclusion of such tests, no evidence of dimensional change has been noted.

Although the materials referred to above have been found to be especially advantageous in a rod-and-tube thermosensing device designed for use in the catalytic converter unit of an automobile exhaust system, other combinations of materials may be more appropriate in other environments. The essential characteristics of the cladding material are that it be resistant to corrosion in the environment in which the device is to be used and that its dimensions and strength be such that, in the direction of thermosensing displacement, any mechanical strain resulting from differences between the thermal coefficient of expansion of the cladding and that of the core occur predominantly in the cladding, and not in the core.

In accordance with the invention, a corrosionresistant cladding may also be provided for the tube member of a rod-and-tube thermosensing device. If only one of the two dissimilar metals used as differential expansion materials in such a device is subject to corrosion in the environment in which it is to be used, however, it is preferable that the material susceptible to corrosion be used as a core for the rod rather than for the tube.

Although the rod-and-tube configuration is the most practical differential displacement thermosensing device for many applications, it will be understood that the principle embodied in this invention is applicable to other differential displacement thermosensing devices such as, for example, parallel rods or other elongate members rigidly attached to one another at one end of each and free at the other.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A temperature thermosensing device useful at a temperature above approximately 1,000°F. comprising a first rod member having a core constituted by a core rod of a refractory metal selected from the group consisting of tungsten, tantalum, molybdenum, niobium and alloys thereof and having a metal cladding of a selected thickness metallurgically bonded to the core rod for protecting the core metal from oxidation and for adapting the first member to undergo dimensional change of a selected degree in response to change in temperature, and a second tube member of a metal having a relatively greater coefficient of thermal expansion than the selected refractory core metal adapting the second member to undergo relatively greater dimensional change than the first member in response to said temperature change, the second member being disposed in spaced coaxial surrounding relation to the first member, the first member having a first end thereof secured to a corresponding first end of the second member and having its opposite end free to move relative to the corresponding opposite end of the second member as an indication of the temperature to which the device is subjected.

2. A device as set forth in claim 1 wherein the cladding metal is selected to display low strength relative to the core metal when the first member is heated to a selected temperature and wherein the thickness of the cladding is selected relative to the relative cross-sectional size of the core rod and to the coefficients of thermal expansion of the core and cladding metals so that the first member undergoes a selected dimensional change when heated to said selected temperature substantially corresponding to the dimensional change that would be displayed by the core rod alone when heated to said selected temperature.

3. A device as set forth in claim 2 wherein the cladding metal comprises a stainless steel consisting essentially of approximately 17 percent by weight chromium, up to about 0.12 percent by weight carbon, and the balance essentially iron.

4. A elevated temperature thermosensing device for use in a corrosive environment comprising a first rod member having a core constituted by a core rod of a refractory metal selected from the group consisting of tungsten, tantalum, molybdenum, niobium and alloys thereof and having a metal cladding metallurgically bonded to the core enclosing all surfaces of the core for protecting the core metal from oxidation, the cladding metal comprising a stainless steel consisting essentially of approximately 17 percent by weight chromium, up to about 0.12 percent by weight carbon and the balance essentially iron having a low strength relative to the core metal at a selected temperature, the cladding having a thickness selected relative to the cross-sectional size of the core rod and to the coefficients of thermal expansion of the cladding and core metals so that the first member undergoes a selected dimensional change when heated to said selected temperature substantially corresponding to the dimensional change that would be displayed by the core rod alone when heated to said selected temperature, and a second tube member of a stainless steel consisting essentially of, by weight, about 32 percent nickel, about 20.5 percent chromium, about 46 percent iron, about 0.04 percent carbon, about 0.4 percent titanium, and about 0.4 percent aluminum so that the second member undergoes relatively greater dimensional change than the first member when heated to said selected temperature, the second member being disposed in coaxial surrounding relation to the first member, the first member having a first end secured to a corresponding first end of the second member and having the opposite end of the first member free to move relative to the corresponding opposite ends of the second member as an indication of the temperature to which the device is subjected.

* * * * *